April 7, 1964 W. LIMBERGER 3,127,825

DEVICE AND A METHOD FOR THE PRODUCTION OF COPIES

Filed April 24, 1961

INVENTOR:

Walter Limberger, by Singer, Stern & Carlberg, Attorneys.

United States Patent Office 3,127,825

Patented Apr. 7, 1964

3,127,825

DEVICE AND A METHOD FOR THE PRODUCTION OF COPIES

Walter Limberger, Hamburg-Poppenbuttel, Germany, assignor to Lumoprint Zindler KG., Hamburg, Germany Filed Apr. 24, 1961, Ser. No. 104,973
Claims priority, application Germany Apr. 28, 1960
2 Claims. (Cl. 95—77.5)

The invention relates to a device for the production of copies, including an exposure device which comprises at least one exposure light source which emits radiation effective for the exposure of light-sensitive sheets.

Such devices are known. For example, the exposure device has been constructed as an exposure device in which the original and the copy sheet are advanced past a source of radiation.

It is known to construct an exposure device with a rotatable and transparent cylinder in which the exposure light sources are arranged and which is at least partly enclosed by several endless guide and pressure belts which are guided around e.g. three rollers outside the cylinder. These belts serve to transport the original and the copy sheet around the cylinder, which can also for example be hung in the belts.

For the production of copies by the diffusion process, the known exposure devices in known apparatus are combined with a diffusion developing device.

It is also known to produce copies using copy sheets from which copies are produced by heat radiation.

Copy sheets which are developable by heat require a high heat concentration in a special treatment step, so it is not possible also to use such devices for exposure of copy sheets provided for the diffusion process since the effective heat would lead to a too strong heating of the apparatus and furthermore would necessitate for the arrangement extensive cooling arrangements which would make the production of the device more expensive. It is however also essential in this connection that the radiations emitted by the heat radiators do not fulfil the requirements for exposure of copy sheets which are not treated according to the heat process.

It has therefore previously always been necessary to have available two comparatively bulky sets of apparatus when copies are to be prepared by the heat process as well as by diffusion treatment. This possibility is however desired in numerous establishments since copies developed by heating and copies produced by the diffusion process differ in quality and cost price and also in durability in use, so that it is advantageous to be able to operate by both processes. In this connection, with the diffusion process in particular, the production of permanent and higher quality copies which are durable and which handle well is possible, while the previously known heating process is suitable in general for the production of copies of lower quality which are also less equal to mechanical requirements and which cannot copy all colours. The latter copies are therefore suitable only for brief use within an establishment.

The rational use of the known copying processes is not possible with previous apparatus, which are each constructed for only one process. Particularly in the case of small establishments which are not in a position to procure two machines, it is necessary to be limited to one process and thus either to produce high quality copies, e.g. by the diffusion process, for all purposes and to accept the higher costs or by use of a known heat copying apparatus always to use copies which have the above-mentioned disadvantages. The basic difference between the two processes has previously made it appear impossible to construct a unitary apparatus enabling the use of both processes.

The invention is based on the problem of overcoming the disadvantages which have previously arisen in the use of different processes and to provide an apparatus and a novel method wherein the apparatus in a simple manner and without considerable installment expense enables the production of copies in accordance with their desired purposes by a simple operation.

This problem is solved by the device according to the invention in that the exposure device, which comprises at least one known exposure light source, has arranged therein a further radiator which emits a heat radiation.

According to an advantageous embodiment of the invention, the one or more exposure light sources and the heat radiator or radiators can be selectively, and for example alternately, switched on. According to the preferred embodiment of the invention, the one or more exposure light sources can be switched on by the main switch of the device, while the heat radiator or radiators are selectably switchable. The switching of the heat radiator can be effected in known manner in dependence on the passage of the original and a copy sheet. According to a particularly advantageous embodiment of the invention, there are suitably provided in combination with the heat radiator two separate exposure light sources one of which is constructed as an ultra-violet radiator, e.g. a discharge tube mainly for the emission of blue light, and the other as a green light discharge tube. Both exposure light sources, according to a particular construction, are able to be switched on separately or together.

The preferred embodiment of the invention includes the described arrangement of at least one heat radiator and one or more exposure light sources in an exposure device through which the original and copy sheet are advanced, wherein the radiator is advantageously provided in a known rotating cylinder to which are guided the guide and pressure belts. In the construction as an exposure device through which the original and copy sheet are advanced, there is advantageously provided an arrangement of the radiator such that first an exposure light source, advantageously for blue light, and subsequently a heat radiator, which advantageously comprises a filament and emits heating radiation, are provided in the direction of advance of the original. This construction enables successive use of exposure and heating radiation effects within a single apparatus having only a transport device and a treatment device.

According to the preferred embodiment of the invention, there is in addition arranged, preferably beyond the heat radiator in the direction of advance, a further exposure light source for green light.

Such a construction makes possible for example the treatment of blueprints, in which radiators emitting mainly blue light are used. If copies are produced according to the diffusion process, an advantageously provided radiator for green light is used for copy sheets which are used in this process, a prior exposure by the blue radiator also being possible. If known copy sheets to be treated by the heat development process are used, the heat radiator is switched on, it being of no importance whether the other exposure radiators are switched on or not, in particular if suitable discharge tubes are used which emit only a little heat or no heat at all. In one advantageous embodiment, a heat radiator is used which emits both heat radiation and light.

The invention also provides a novel process for the production of copies, e.g. using the materials described in the above-mentioned patent applications. This method includes a prior exposure of the materials by a blue light radiator, preferably of the described type, and a subsequent treatment by a heat radiator simultaneously emitting light. The invention thus provides a process in which exposure and heat treatment occur successively, whereby the exposure and the heat treatment advantageously fulfil the above-mentioned requirements. In the use of this process for carrying out exposure and subsequent heat treatment, the invention includes a simultaneous energization of the blue radiator and the heat radiator.

The invention is described below with reference to a constructional embodiment illustrated in the drawing. In the drawing.

Figure 1:
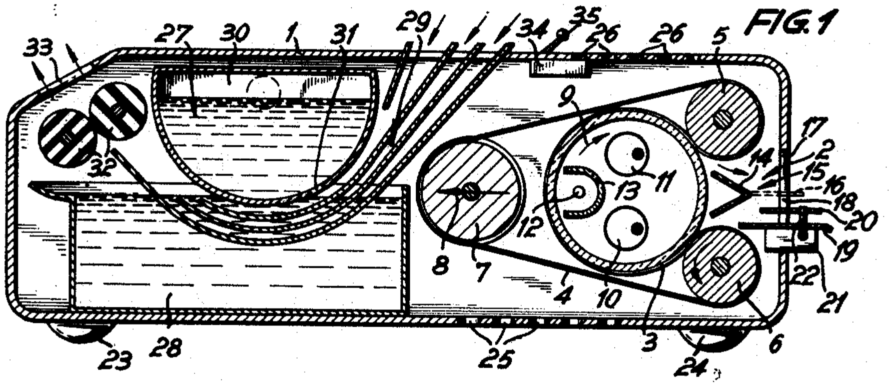
FIG. 1 shows a schematic side view in section of one form of the apparatus.

As shown in FIGURE 1, there is provided a flat, desk-like housing 1 at the front side of which there is provided a slot arrangement 2. Behind this front side there is located an exposure device comprising an advantageously transparent cylinder 3 which is suitably hung in several parallel guide and pressure belts 4, e.g. of rubber or plastics material, which extend around the greater part of the periphery of the cylinder. The belts 4 are guided over rollers 5, 6 and 7, of which the latter for ensuring the parallel running of the belts can comprise in known manner circumferential webs and which can also be supported adjustably or under elastic stress for stretching the belts in the direction of the arrow 8. At least one of the rollers, e.g. the roller 6, is arranged to be driven in the direction of the arrow shown. On driving of the roller 6 in the direction shown, the cylinder 3 rotates in the direction of the arrow 9. In the cylinder 3 are arranged several radiators. These radiators can for example be supported on walls of the apparatus extending parallel to the plane of the drawing, whereby one of these walls can be an intermediate wall behind which are located the switching and connection devices.

The radiators 10, 11 are for example discharge tubes or filament lamps. Each is advantageously a light radiator suitable for the exposure of copy sheets for the diffusion process and suitably emitting little or no heat. Advantageously the radiator 10 is a so-called ultra-violet radiator and in particular it is advantageously a discharge tube which emits substantially blue light. The radiator 11 is advantageously a green light radiator.

The radiator 12 is a heat radiator which in the illustrated embodiment comprises for example a filament lamp which is constructed so that considerable heat is produced and advantageously light radiations are also emitted. The radiator 12 is arranged in a reflector 13 which is open towards the adjacent section of the periphery of the cylinder 3 and which is advantageously constructed so that a beam of the heat radiation falls on the original and copy sheet guided on the exterior of the cylinder. The reflector advantageously has a considerable heat capacity and acts as a heat insulator in order to avoid appreciable temperature fluctuations in the neighbouring parts of the apparatus on switching on the radiator 12. The reflector comprises for example steel with a special treatment of the inner surface.

The arrangement is such that the rollers 5 and 6 lie above and below the slot arrangement 2. Between the rollers there is arranged a guide surface 14 which is V-shaped in cross section and the apex of which faces the slot 15 and if necessary, i.e. in the construction according to FIG. 6 and as is indicated in dotted lines in FIG. 1, can extend through the slot 15 by means of a strip-like extension 16 in order to separate an outlet slot 17 from an inlet slot 18. It is sufficient however to have a construction without the extension 16, since the guide surface 14 in the interior of the apparatus ensures the correct guiding in between the cylinder 3 and the roller 6. Furthermore, in the slot arrangement 2 above the lower limit of the slot, which is constructed with an insertion plate 19, there is provided a guide element 20. Between the surface 19 and the guide element 20 there is constructed a special inlet slot which in the embodiment illustrated serves only for the guiding of an original and of copy sheets which are treated by a heating effect, i.e. by use of the radiators 12. Beneath the insertion surface 19 there is arranged a microswitch 21, the actuating element 22 of which projects into the space between the surface and the guide element 20. The surface 19 and the guide element 20 are provided with slots to enable pivotation of the actuating element 22 in the direction of the arrow shown for switching on the radiator 12 on insertion of copy sheets. The actuating element 22 is spring biased and is elastically held in the tripping position.

The housing 1 is suitably provided with pedestals 23, 24 and has at its bottom ventilation apertures 25 and in its cover surface further ventilation apertures 26. Between the apertures 25 and 26 there is produced a flue effect for the extraction of heat. Furthermore, the construction with the belts 4 is particularly suitable for heat extraction since these belts are guided, during a large portion of their path, spaced from the cylinder 3. The rollers 5, 6 and 7 can for example be constructed of good heat conductive material, advantageously metal, in order to draw off heat. Cooling of one or more of the rollers 5, 6 and 7 is possible. Furthermore, within the scope of the invention there is included the arrangement of a cooling device, for example a ventilator, beneath the roller 7.

In the housing 1 there is furthermore provided a diffusion development device, indicated in general by reference numeral 27, which comprises a bath container 28 with guide elements 29 for the guiding of copy sheets through the liquid and a replenishment container 30 for the developer liquid, the bottom of which both serves as the upper guide element and by means of an opening 31 ensures that the liquid is maintained at a predetermined level. At the end of the guide path formed by the guide element 29 there is a driven squeezing and transport roller pair 23 above which there is located an outlet slot 33 in an inclined surface of the housing.

At the top of the housing there is provided a main switch 34 with an actuating member 35 for switching on the apparatus, advantageously in the manner described hereinafter. According to FIG. 4, two connection terminals 36, 37 are provided. In a conductor there is located the main switch 34 beyond which are arranged on one side a drive device 38 and the connection elements for the radiators. The radiators are indicated in the circuit diagram by the same reference numerals as in FIG. 1.

It can be seen that the radiators 10, 11 can be switched on through a series resistor 39, e.g. a choke, by the main switch 34. The radiator 12 is switched on by a relay 40 in dependence on actuation of the microswitch 21. The relay is a delay relay, in particular constructed with delayed cut-off, the rectifier 41 and the condenser 42 being arranged in parallel. The working contact 43 of the relay connects the radiator 12 in circuit. The delayed cut-off construction has the purpose of maintaining the connection until the rear edge of the original and the copy sheet have passed the radiator 12. The cut-off delay is determined by appropriate selection of the condenser with reference to the peripheral speed of the cylinder 3.

Figure 2:
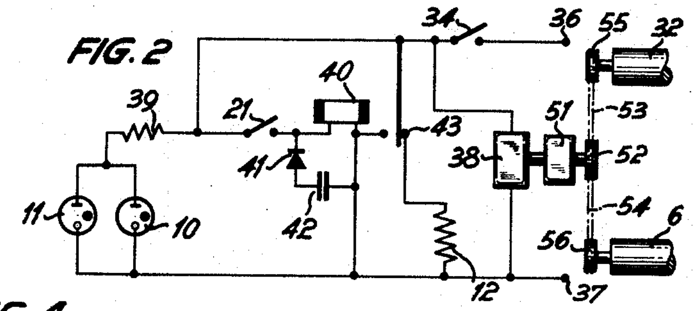
FIG. 2 is a schematic circuit diagram for energising the radiators provided in FIG. 1.

From FIG. 2 can also be seen the connection of the driven part of the apparatus according to FIG. 1. Assuming that the drive device 38 comprises an electric motor, it can be seen from FIG. 2 that the output shaft thereof is connected to a reduction drive 51. From this drive shaft, on which e.g. a belt pulley 52 can be arranged, two drive connections 53, 54, e.g. belts, extend to correspondingly dimensioned belt pulleys 55, 56 on the shaft ends of rollers 32 and 6.

Figure 3:
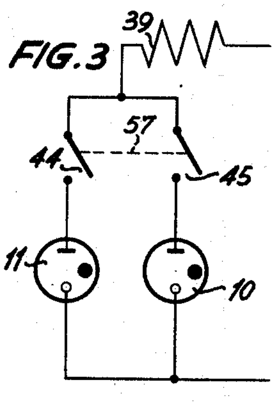
FIG. 3 is a modified form of a part of the circuit according to FIG. 2.

According to FIG. 3, in which the connection of the radiators 10 and 11 is shown, these radiators are selectively energizable by special switch contacts 44 and 45. These switches can be connected together so that alternate switching, or, according to a different embodiment, a common switching, can be carried out.

In FIG. 3, a coupling of this type is shown by the dotted line 57.

Figure 4:
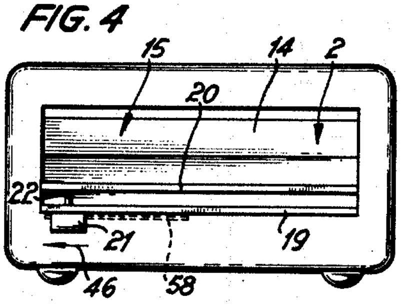
FIG. 4 is a front view of the apparatus according to FIG. 1.

FIG. 4 shows a front view of the apparatus with the slot arrangement 2. The slot as a whole is shown in FIG. 1 by reference numeral 15. Through this slot can be seen the V-shaped guide surface 14. At the bottom is located the guide element 20 above the insertion surface 19. Below the insertion surface 19 there is arranged the microswitch 21, the actuating member 22 of which extends through the inlet slot between the parts 19, 20. It is possible to arrange the microswitch movable in the direction of arrow 46 so that the actuating member 22 can be moved to the edge or even out of the range of the slot arrangement 2, so that the space between the insertion plate 19 and the guide element 20 can also be used as an inlet slot for an original and a copy sheet which are to be treated according to the diffusion process. For movable support of the switch 21 there is provided for example a guide plate arrangement 58 shown in dotted lines at the lower insertion surface 19.

Figure 5:
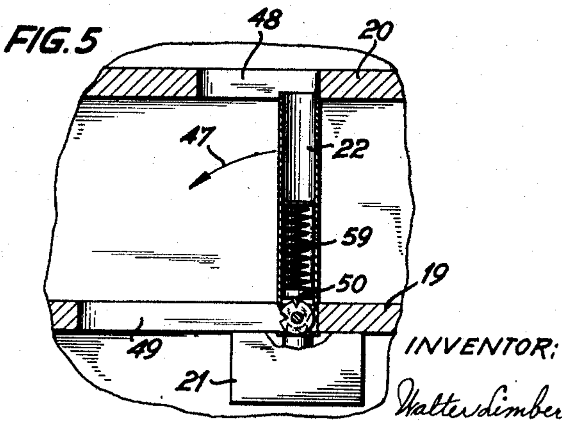
FIG. 5 is a partial view according to FIG. 4, enlarged and taken in section, illustrating a modified construction.

The modification according to FIG. 5 shows a fixed arrangement of the microswitch 21 below the insertion plate 19. The actuating member 22 is however tiltable in a direction, shown by arrow 47, perpendicular to that of its switching movement, which is directed to the interior of the apparatus, whereby for effecting this movement a slot 48 is provided in the guide element 20 and a slot 49 is provided in the insertion surface 19 for receiving the actuating element. The actuating element has a click-stop device 50 with a spring 59 by which it is held in the upright or the hinged position.

Also according to FIG. 5, by hinging of the actuating element 22 there is provided an embodiment which has a defined inlet slot which can be employed for each use.

Figure 6:
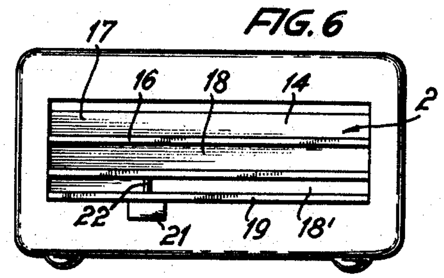
FIG. 6 is a front view of an apparatus corresponding to FIG. 1 but having a modified construction of the inlet slot arrangement.

FIGURE 6 shows an embodiment provided with the guide 16 shown in broken lines in FIG. 1. In this embodiment the actuating element 22 of the microswitch 21 can be fixed in position and movable only in the working direction, since an outlet slot is provided by the slot region

17 while two inlet slots are provided, of which the slot 18 is required using copy sheets for the diffusion process and the slot 51 is required using copy sheets which need the heating process.

I claim:

1. In a device for producing copies, at least one first radiation source effective for exposure of light-sensitive copy sheets, at least one second radiation source emitting heat, movable guide means effective to guide an original and a copy sheet past said first and second radiation sources, drive means for said movable guide means, a housing enclosing said first and second radiation sources and movable guide means and having inlet and outlet means, stationary guide members in said inlet means and forming a slot, electric circuit means for energizing said first and second radiation sources and said drive means, a first switch in said circuit means for connecting said first radiation source, a second switch in said circuit means for connecting said second radiation source, actuating means for said second switch pivotally connected therewith, and a click-stop device in the connection between said actuating means and second switch for selectively retaining said actuating means in a first position in which it projects into said slot and a second position in which it leaves said slot unobstructed.

2. In a device for producing copies, at least one first radiation source effective for exposure of light-sensitive copy sheets, at least one second radiation source emitting heat, movable guide means effective to guide an original and a copy sheet past said first and second radiation sources, drive means for said movable guide means, a housing enclosing said first and second radiation sources and movable guide means and having inlet and outlet means, stationary guide members in said inlet means and forming a slot, electric circuit means for energizing said first and second radiation sources and said drive means, a first switch in said circuit means for connecting said first radiation source, a second switch in said circuit means for connecting said second radiation source, actuating means for said second switch pivotally connected therewith, and a slide connection between said second switch and one of said stationary guide members, whereby said second switch is shiftable to a position entirely out of the range of said slot.

References Cited in the file of this patent

UNITED STATES PATENTS

| | | |
|---|---|---|
| 2,435,099 | Pratt | Jan. 27, 1948 |
| 2,740,895 | Miller | Apr. 3, 1956 |
| 2,903,954 | Schwienbacher | Sept. 15, 1959 |
| 2,921,513 | Frantz | Jan. 19, 1960 |